United States Patent
Brunner et al.

(10) Patent No.: US 6,341,761 B1
(45) Date of Patent: Jan. 29, 2002

(54) SEATED VALVE

(75) Inventors: Rudolf Brunner, Baldham; Martin Heusser, Munich, both of (DE)

(73) Assignee: Heilmeier & Weinlein Fabrik F. Oel-Hydraulik GmbH & Co. KG (DE)

( * ) Notice: Subject to any disclaimer, the term of this patent is extended or adjusted under 35 U.S.C. 154(b) by 0 days.

(21) Appl. No.: 09/620,500

(22) Filed: Jul. 20, 2000

(30) Foreign Application Priority Data

Jul. 22, 1999 (DE) ..................................... 299 12 784 U

(51) Int. Cl.[7] .................................................. F16K 1/14
(52) U.S. Cl. ........................................ 251/318; 137/901
(58) Field of Search ............................ 251/318; 137/901

(56) References Cited

U.S. PATENT DOCUMENTS 4,391,183 A  * 7/1983  Broms et al. .................. 91/461
4,676,271 A    6/1987  Fujikawa
5,407,173 A    4/1995  Smith

FOREIGN PATENT DOCUMENTS

| DE | 1 282 388    | 3/1969  |
|----|--------------|---------|
| DE | 37 22 343 A1 | 1/1989  |
| DE | 295 13 944 U1| 11/1995 |
| DE | 298 10 860 U1| 9/1998  |

* cited by examiner

*Primary Examiner*—John Fox
(74) *Attorney, Agent, or Firm*—Cook, Alex, McFarron, Manzo, Cummings & Mehler, Ltd.

(57) ABSTRACT

A seated valve comprising a housing and a valve seat, a cylinder bushing for an actuation and a closure element provided in a bore of said housing, said closure element being adjustable in relation to said valve seat by means of the actuator, said closure element being a full sphere having a concentric waist portion the diameter of which being larger than the diameter of said valve seat but smaller than the inner guiding diameter of said cylinder bushing, which guiding diameter of said cylinder bushing being smaller than the diameter of said full sphere, such that said closure element can be inserted into or removed from said cylinder bushing from the out side of said housing.

11 Claims, 1 Drawing Sheet

SEATED VALVE

DESCRIPTION

Figure 1:
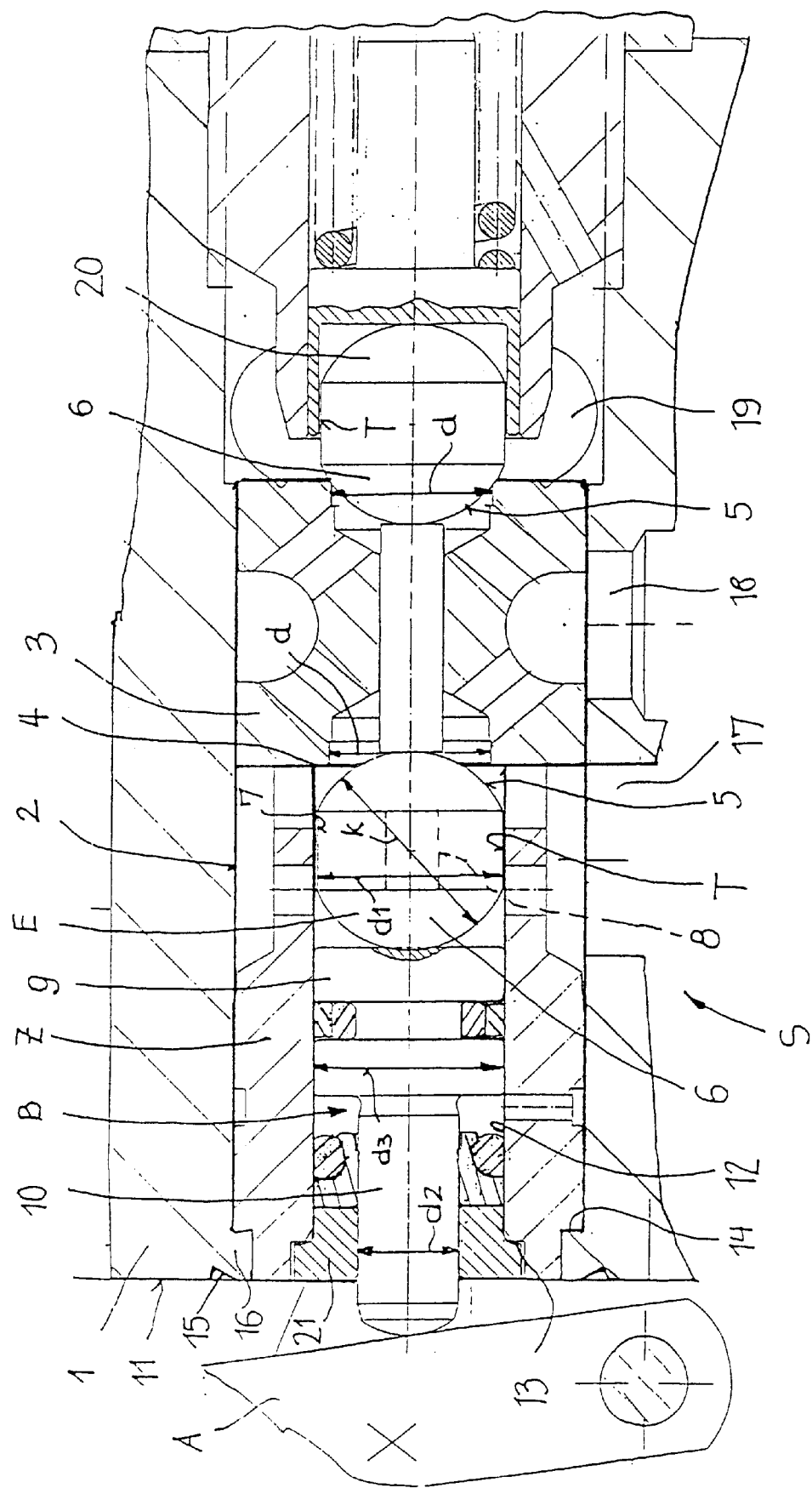

The invention relates to a seated valve as disclosed in the preamble of claim 1.

As known from DE-U-298 10 860, FIG. 4, in a seated valve formed as a 3/2-ways seated valve with solenoid actuation, the closure element co-acting with the valve seat at the side of the actuator is a full sphere made of steel. Full spheres allow to achieve an absolutely leakage-free closing position between the spherical sealing surface of the closure element and the circular valve seat and in addition are available in different sizes and for fair costs. The diameter of the valve seat is dictated by the requirements valid for the seated valve, e.g. the maximum through flow rate and the allowed through flow resistance at maximum through flow rate. The radius of the spherical sealing surface of the closure element has to be matched with the diameter of the valve seat in order to assure an optimum co-action between both. On the other hand, it is intended to keep the interior guiding and sealing diameter of the cylindrical bushing as small as possible, about coinciding to the diameter of the valve seat, in order to maintain the forces moderately resulting from the pressure behind the closure element and acting on the actuator as well as the actuation force for adjustments of the closure element against the valve seat. The sphere diameter of a fair cost full sphere used as the closure element is in contradiction to said intention, because said full sphere diameter is considerably larger than the diameter of the valve seat. For this reason, the cylindrical bushing inner bore conventionally has a widened portion receiving the full sphere in the region between the actuator and the valve seat. Said widened portion requires to insert the full sphere closure element into the seated valve already together with said cylindrical bushing. The closure element then remains captured within said widened portion. In view to a simple and fair cost manufacturing of the housing bore and the cylindrical bushing, and also for mounting reasons, the cylindrical bushing conventionally is pressed into the housing bore and is secured in place by mortising the outer side of the housing around the opening of said housing bore. Said securing in place by mortising cannot be released without damage. When forming and mounting the valve seat within the housing bore and during the assembly of the cylindrical bushing the circular edge of the valve seat may be damaged or deformed which is detrimental for the leakage-free co-action between the spherical sealing surface of the closure element and the valve seat. Even other influences may deteriorate the roundness of the valve seat or the preciseness of a tapered chamfer of the valve seat, e.g. corrosion. Finally, after long time operation of the seated valve the leakage-free co-action may suffer from impacts occurred or wear. In all said cases a subsequent treatment of the valve seat is no longer possible due to the full sphere captured within said cylindrical bushing without destroying the cold flow formation used to position the cylindrical bushing in place.

Further prior art related to seated valves having centreless ground spheres used as closure elements can be found in DE-U-295 13 944.

It is an object of the invention to create a seated valve of the kind as disclosed above in which a necessary subsequent treatment of the valve seat at its side facing towards the actuation means can be made possible and for which the advantage of a simple manufacturing and mounting and the method of cold flow deformation when positioning the cylindrical bushing remains.

Said object can be achieved by the features of claim 1.

Even though the closure element by its spherical sealing surface optimally co-acts with the circular valve seat (no leakage in the closing position), thanks to the waist portion the closure can be inserted at any time into the already positioned cylindrical bushing or can be removed therefrom and the inner guiding and sealing diameter of the cylindrical bushing can be dimensioned as small as possible. It is possible at any time to carry out a subsequent treatment of the valve seat without destroying cold flow deformation positioning the cylindrical bushing. In addition, by said waist portion a proper guidance of the closure element within the inner bore of the cylindrical bushing is achieved so that the frequently occurring dancing of a full sphere closure element is prevented which not only generates loud noises but also significant wear. The waist portion of the closure element made from a fair cost full sphere with moderate efforts and very accurately allows to insert and remove it easily.

The diameter of the waist portion of the closure element ought to be slightly smaller than the inner guiding and sealing diameter of the cylinder bushing in order to guarantee an unobstructed operation movement of the closure element and its easy removal or insertion.

It is expedient for the manufacturing when the inner sealing and guiding diameter of the cylindrical bushing remains uniform along its longitudinal extension or if it increases by at least one step towards the outer side. Said step could be located at the end region of the cylindrical bushing facing the outer side of the housing and allows to place a closure ring there. The smallest inner diameter of the cylindrical bushing is provided where the closure element is to be received.

Expediently the waist portion of the closure element is ground cylindrically in order to achieve a proper guiding of the closure element. For grinding the full sphere expediently a centreless-grinding process is applied. In a centreless grinding process a driven cylindrical grinding disk is situated vis-à-vis to an also driven cylindrical driving disk with an intermediate distance varied by adjusting both disks towards each other. Into the intermediate space between said disks one full sphere or several full spheres are placed side by side supported by a guiding rod. No further auxiliary devices are required. Such a grinding run lasts only a few tenths of a second, e.g., for an 8 mm full sphere made of hardened steel.

Alternatively, said waist portion could be formed by a circumferential groove (e.g. machined on a lathe) resulting from a chipping or grinding process.

The diameter of the waist portion of the closure element should lie between about 75% and 90% of the full sphere diameter.

For manufacturing and mounting it is of advantage to form the valve seat at an insert pressed into the bore of the housing. When pressing in said insert or for the reasons mentioned above the valve seat, e.g. in use, may lose its circular shape, however, prior to inserting the closure element or after removal of the closure element the valve seat in place can be subsequently treated accordingly. It is then of secondary importance whether the cylindrical bushing is abutting said insert with axial pressure or not, because such subsequent treatment will remedy any deformation of the valve seat. It is to be noted that such a subsequent treatment can be made in the already final operating position of the cylindrical bushing and the insert.

In order to secure the cylindrical bushing in place by cold flow deformation in the simplest way the outer side of the housing surrounding the end of the cylindrical bushing is mortised. This further leads to an efficient sealing effect.

The diameter of the full sphere should be about 125% and the diameter of the waist portion about 113% of the diameter of the valve seat.

The push rod of the actuator at which the actuating forces are acting and which has to be sealed towards the exterior should have a diameter which is about 60% of the diameter of the valve seat.

In order to use a single closure element type in a certain seated valve type even if this type contains several co-operating valve units, another closure element situated at the spring loaded side opposite to the actuator side should be of the same form and size as the closure element at the actuating side.

An embodiment of a seated valve shown in a longitudinal section will be explained with the help of FIG. 1.

A bore 2 is formed in a housing 1 (e.g. made of steel). Said bore enters from an actuator outer side 11 of housing 1. A ring-shaped insert 3 (made of steel) is pressed into bore 2 and is provided with a circular valve seat 4 facing the actuator outer side 11. A cylindrical bushing Z is pressed into said bore 2 behind said insert 3 and from the actuator outer side 11. Said cylindrical bushing Z may abut by its inner end at insert 3 and is secured in position at its outer end by cold flow deformation, particularly mortising at 15 such that material 16 of housing 1 is driven behind an outer shoulder 14 of cylindrical bushing Z.

A closure element E having at least one spherical sealing surface 5 is received within cylindrical bushing Z. Said sealing surface 5 can be pressed against valve seat 4 in order to block a flow connection between ports 17 and 18 of bore 2. Closure element 6 is made out of a full sphere 6 with a concentric waist portion T the diameter d1 of which is smaller than the diameter k of the full sphere. Said waist portion T e.g. is cylindrical and is made by grinding, particularly by centreless grinding. Alternatively, (indicated in dotted lines) said waist portion T could be formed by a circumferential groove 8 in the full sphere 6. In the embodiment shown said waist portion T is forming an accurate cylindrical guiding surface 7.

In an inner bore 12 of cylindrical bushing Z an actuator B is guided slidingly and is sealed and is placed behind closure element E. In the shown embodiment actuator B is a piston 9 having a push rod 10 connected thereto. Bush rod 10 protrudes with its free end beyond said actuator housing outer side 11. An actuator A is engaging in the shown embodiment at push rod 10. Said actuator A e.g. may be a lever actuated by a solenoid. It is instead possible to have a lever, a push button, a switching contour or a switching solenoid or another driven actuator directly engaging at push rod 10 such that closure element E can be moved out of the shown lifted position onto valve seat 4.

The inner bore 12 of cylindrical bushing Z has a diameter d3 which is uniform from insert 3 towards a shoulder 13. Said shoulder 13 serves to secure a ring 21 serving to support sealing means and to close the annular gap between push rod 10 and inner wall 12.

Another valve seat is formed on insert 3 at the side opposite to valve seat 4. Said further valve seat co-operates with another closure element 20 of the same form and size as closure element E, i.e. also closure element 20 has a spherical sealing surface and a cylindrical waist portion T and is made from a full sphere 6. Closure element 20 is actuated by a spring which holds closure element E by means of a motion transmitting coupling in the lifted position in cylindrical bushing Z as shown in FIG. 1, as long as actuator A is not actuated.

When assembling seated valve S first insert 3 is pressed into bore 2. Then cylindrical bushing Z is pressed into abutment on insert 3 and is mortised at 15. Before closure element E and actuator B with its sealings are inserted. Valve seat 4 may be subsequently treated to remove possible deformations of valve seat 4 which occurred when pressing in insert 3 and/or cylindrical bushing Z. Then closure element E is inserted and subsequently actuator B with its sealing and ring 21 are inserted.

In case that during operation of the seated valve the leakage-free tightness between closure element E and its valve seat is lost the above-mentioned inner components are removed and valve seat 4 is subjected to a subsequent treatment. In both cases (subsequent treatment prior to any operation or subsequent treatment after operation) the positioning of the cylindrical bushing Z by cold flow deformation, e.g. by mortising, does not need to be destroyed. Said closure elements E, 20 expediently are made from hardened and ground full solid steel spheres. In case of mean operation requirements it may suffice to form valve seat 4 in insert 3 of non-hardened steel and/or to employ closure elements made of non-hardened steel as well.

The diameter relations in such a seated valve inter alia are dominated by the required diameter d of valve seat 4. In a preferred embodiment the full sphere diameter k is about 125%, the waist portion diameter d1 is about 113%, the inner bore diameter d3 is about 150%, and the push rod diameter d2 is about 60%, of the diameter d of valve seat 4, respectively.

We claim:

1. Seated valve (S) having a housing (1), a housing bore (2) in which a valve seat (4), a cylindrical bushing (Z) and actuator (B) for displacing a closure element (E) onto said valve seat (4) are positioned, said closure element (E) having a spherical sealing surface (5) and being received axially movable within said cylindrical bushing, said actuator (B) being sealingly guided within said cylindrical bushing and being freely accessible from an outer actuating housing side (11), said cylindrical bushing (Z) being secured in place by cold flow deformation of the material of housing (1) at said outer housing side (11), characterised in that said closure element (E) is made out of a full sphere (6) with a concentrically formed waist portion (T) the diameter (d1) of which is smaller than the sphere diameter (k) but larger than the diameter (d) of said valve seat (4), and that said closure element (E) can be inserted from said outer housing side (11) into said cylindrical bushing or can be removed therefrom with the cylindrical bushing (Z) secured in place in said housing bore (2).

2. Seated valve as in claim 1, characterised in that said diameter (d1) is slightly smaller than the inner sealing and guiding diameter (d3) of cylindrical bushing (Z), preferably by 0.1 to 0.2 mm.

3. Seated valve as in claim 1, characterised in that an inner sealing and guiding diameter (d3) of cylindrical bushing (Z) is kept uniformly from its end adjacent to said valve seat (4) towards said housing outer side (11), or is formed to increase by a step (13).

4. Seated valve as in claim 1, characterised in that said waist portion (T) of said closure element (E) is ground cylindrically, preferably by centreless grinding.

5. Seated valve as in claim 1, characterised in that said waist portion (T) of said closure element (E) is formed by a circumferential groove (8).

6. Seated valve as in claim 1, characterised in that said diameter (d1) of said waist portion (T) amounts to about 75% to 90% of the full sphere diameter (k).

7. Seated valve as in claim 1, characterised in that said valve seat (4) is provided at an insert (3) made of hardened or non-hardened steel which insert (3) is pressed into said housing bore (2), and that cylindrical bushing (Z) when secured in place axially abuts said insert.

8. Seated valve as in claim 1, characterised in that the outer end of said cylindrical bushing (Z), preferably being formed with a shoulder (14), is secured in place by mortising.

9. Seated valve as in claim 1, characterised in that said waist portion diameter (d1) amounts to about 113% and said full sphere diameter (k) to about 125% of diameter (d) of said valve seat (4).

10. Seated valve as in claim 1, characterised in that said actuator (B) has a push rod (10) the diameter (d2) of which amounts to about 60% of diameter (d) of said valve seat (4).

11. Seated valve as in any of the preceding claims, characterised in that a further closure element (20) having the same form and size as closure element (E) is provided at the side of insert (3) opposite to the side of closure element (E), said further closure element being spring loaded and coupled in pressure transmitting direction with closure element (E).

* * * * *